United States Patent [11] 3,612,279

[72] Inventor Ernest W. Hostetter
 Lincoln, Iowa 50652
[21] Appl. No. 878,693
[22] Filed Nov. 21, 1969
[45] Patented Oct. 12, 1971

[54] CARBON WATER FILTER
 6 Claims, 3 Drawing Figs.
[52] U.S. Cl. .................................................. 210/170,
 210/206, 210/323, 210/449, /, 210/460
[51] Int. Cl. ....................................................... B01d 35/02,
 B01d 29/24
[50] Field of Search .......................................... 210/460,
 462, 449, 323, 333, 170, 206

[56] References Cited
 UNITED STATES PATENTS
1,591,229 7/1926 Oliver et al. .................. 210/333 X
2,269,725 1/1942 Malanowski ................. 210/193 X
2,625,273 1/1953 Schuller ....................... 210/333 X Primary Examiner—Frank A. Spear, Jr
Attorney—Charles L. Lovercheck ABSTRACT: A filter for liquid, including well water, comprised of four large tubes, plugged at their ends and suspended vertically as a unit within a tank. The liquid is introduced into the tank in such a manner as to be sprayed in diverse directions near the tank's bottom to assure even circulation. The circulation is through circumferential slots or perforations in the tubes, but the liquid must first pass through a filter cloth wrapped around each tube, this cloth being coated with a mixture of activated powdered carbon, diatomaceous earth, and fiber. During this flow through the mixture, the filter cloth, and into the tubes through the slots or perforations, the taste of chlorine, rust, sediment, or any other undesirable substance is removed from the liquid. The tubes are connected with each other at their tops, from which connection is an outlet for the liquid.

PATENTED OCT 12 1971

3,612,279

Inventor
ERNEST W. HOSTETTER

By Charles L. Lovercheck

Attorney

CARBON WATER FILTER

STATEMENT OF INVENTION

This invention relates to filters and, more particularly, to activated chemical filters for filtering well water and the like.

OBJECTS OF THE INVENTION

It is an object of the invention to provide an improved filter.

Another object of the invention is to provide a filter that is simple in construction, economical to manufacture, and simple and efficient to use.

DETAILED DESCRIPTION OF THE DRAWINGS

Figure 1:
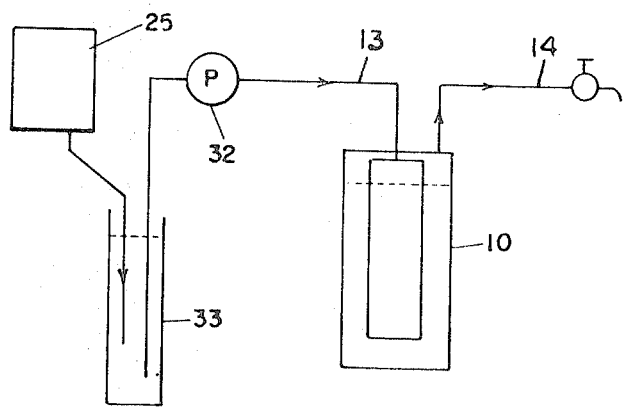
FIG. 1 is a schematic view of a filter according to the invention connected to a well.
Figure 3:
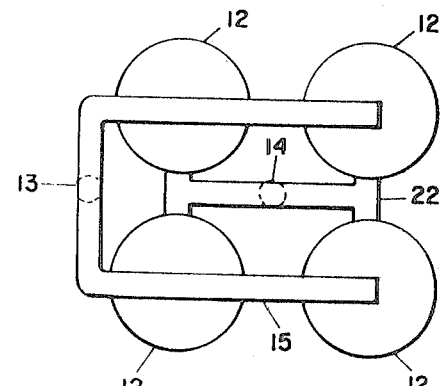
FIG. 3 is a top view of the filter.
Figure 2:
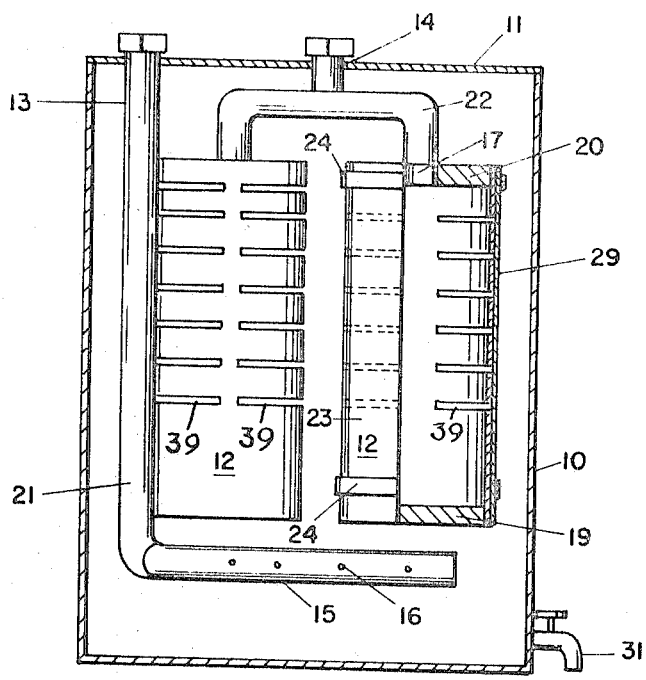
FIG. 2 is a longitudinal cross-sectional view of the filter.

Now with more specific reference to the drawings, the filter is shown supported in a filter container which may be in the form of a tank 10, having a cover 11, inlet tube 13 and 21, and outlet tube 14 supported on the cover by means of suitable locknuts and the filter being disposed in the tank. The tank may be, for example, a tank 33½ inches deep and 9 inches in diameter. The inlet pipe extends down and terminates in U-shaped pipes 15 which have openings 16 in their upper sides so that water will be directed up toward the cylinders. The cylinders have closed ends and have openings 17 in their upper ends which are connected to the pipes 22. The upper ends of the pipes are plugged with plugs 20 which may be of cedar or redwood. A filter cloth 23 is wrapped around each of the hollow cylinders and held in place by clamps 24. The water may be supplied from a well 33 by a pump 32. Chlorine may be injected into the well from a container 25 and the container 10 may be connected to the outlet pipe 14 as shown.

The cylinders 12 may be, for example, three inches in diameter and 33¼ inches long with three rows of slots 39 in each circumferential row. There may be 41 slots in each row, making a total of 123 slots in each tube, for example. The large tubes or hollow cylinders are plugged with ¾-inch disks of dried cedar or redwood at each end. The hollow cylinders are covered with filter cloth showing the cylinder at the left uncovered for better illustration. The filter cloth 29 is held in by stainless steel clamps 24. The filter cloth is precoated with a mixture of powdered, activated carbon, a material sold under the trademark "AQUA-NUCHAR" prepared by the West Virginia Pulp & Paper Company of Covington, Va. and with "FIBRA-FLO," which is a trademark for a product sold by the Johns-Manville Company. The "FIBRA-FLO" material is a mixture of chrysotile asbestos fibers and a material known as "HYFLO SUPER-CEL," a trademark owned by the Johns-Manville Company. The asbestos accounts for about 10½ percent of the weight of the mixture. The "HYFLO SUPER-CEL" is a diatomaceous earth filter material. As the chlorine in the water is drawn from the top in the filters, through the carbon precoat, the taste of chlorine and rust are removed from the water. The chlorine is placed in the well 23 by means of a small chemical feed pump 25, which operates in conjunction with the water pump. A 20-gallon container may be used as a supply for chlorine indicated at 25. The chlorine may be provided by means of a five percent chlorine bleach. The filter core is precoated by filling about eight inches of water in the bottom of the tank 10, then precoat material is thoroughly mixed in. The tank is then filled to within eight inches to ten inches of the top and well mixed. Then the core is gradually lowered into the tank and the cover bolted in place. The water is then allowed to flow from the filter through a faucet to a drain until it is clear and all the fine particles of carbon are washed out. The filter is then ready for use. When the flow of water through the filter has diminished below the desired rate of flow, the core is removed, washed off of old carbon and rust and a new charge is put in and the filter is ready for reuse. The tank may be drained by faucet 31.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A filter comprising at least one hollow cylinder plugged at each end,
   a pipeline connected in series with the inside of said cylinder,
   said cylinder having openings formed in its outside surface,
   a filter cloth disposed around the outside of said cylinder,
   a container,
   said cylinder being disposed in said container,
   said pipe being adapted to be connected to a water supply,
   and outlet means from said container,
   at least four said cylinders being provided, said cylinders having closed ends,
   said cylinders being disposed in side-by-side relation,
   a tank,
   said cylinders being supported in said tank,
   a pipe connected to the top of said tank and terminating in a generally U-shaped portion disposed below said cylinders,
   said U-shaped portion of said pipe having spaced openings therein,
   an outlet pipe connected through said container to the outside thereof,
   openings in the side wall of each said cylinder,
   and a filter web disposed around each said cylinder,
   said web being coated with a material containing activated carbon,
   said tank being connected to a water supply from a well containing iron and chlorine,
   a pump for pumping said water from said well to said filter,
   a dispensing means connected to said well for introducing chloride into said well.

2. The filter recited in claim 1 wherein said filter web is held in place by straplike clamps.

3. The filter recited in claim 1 wherein said filter web is a filter clothlike material.

4. The filter recited in claim 3 wherein said outlet pipe is connected to two generally U-shaped pipes, one connected to the closed end of each said cylinder.

5. The filter recited in claim 4 wherein each said cylinder has a plurality of circumferentially disposed slots.

6. The filter recited in claim 1 wherein means is provided for directing water from the inlet pipe to a position below said cylinders.